United States Patent [19]

Brister

[11] 4,220,012
[45] * Sep. 2, 1980

[54] APPARATUS FOR FREEZING A SLUG OF LIQUID IN A SECTION OF A LARGE DIAMETER FLUID TRANSMISSION LINE

[76] Inventor: Beryle D. Brister, P.O. Box 2329, Amarillo, Tex. 79105

[*] Notice: The portion of the term of this patent subsequent to Sep. 12, 1995, has been disclaimed.

[21] Appl. No.: 878,254

[22] Filed: Feb. 16, 1978

Related U.S. Application Data

[63] Continuation-in-part of Ser. No. 722,665, Sep. 13, 1976, Pat. No. 4,112,706.

[51] Int. Cl.² .................... F25B 41/04; G01K 13/00; G01M 3/02
[52] U.S. Cl. .................................. 62/130; 62/293; 62/514 R; 73/40.5 R
[58] Field of Search ............... 73/40.5 R, 40.5 A; 62/293, 138, 514 R; 138/97, 89; 239/550, 13; 165/DIG. 11

[56] References Cited

U.S. PATENT DOCUMENTS

| | | | |
|---|---|---|---|
| 2,257,727 | 10/1941 | Bennett et al. | 62/463 X |
| 2,277,286 | 3/1942 | Bechtner | 62/519 X |
| 2,320,506 | 6/1943 | Bennett et al. | 62/1 |
| 2,483,082 | 9/1949 | Young et al. | 138/97 |
| 2,572,555 | 10/1951 | Young et al. | 62/1 |
| 2,701,452 | 2/1955 | Hopkins | 62/138 X |
| 3,028,450 | 4/1962 | Manning | 179/1 ST |
| 3,041,850 | 7/1962 | Nunn | 62/293 |
| 3,293,877 | 12/1966 | Barnes | 62/514 R X |
| 3,338,499 | 8/1967 | Gilbert | 62/293 X |
| 3,623,337 | 11/1971 | Tremont | 62/293 |
| 3,623,668 | 11/1971 | Freid | 239/550 X |
| 3,673,810 | 7/1972 | Hales et al. | 62/514 R X |
| 3,695,301 | 10/1972 | Pittman | 62/293 X |
| 3,804,159 | 4/1974 | Searight et al. | 165/DIG. 11 |
| 3,827,282 | 8/1974 | Brister | 73/40.5 R |
| 3,926,006 | 12/1975 | Brooks et al. | 138/97 X |
| 4,075,601 | 2/1978 | Flournoy | 73/40.5 X |
| 4,112,706 | 9/1978 | Brister | 62/514 R |

FOREIGN PATENT DOCUMENTS

| | | | |
|---|---|---|---|
| 697375 | 1/1931 | France | 62/514 R |
| 591822 | 8/1947 | United Kingdom | 73/40.5 R |
| 1209144 | 10/1970 | United Kingdom | 62/293 |

Primary Examiner—Daniel M. Yasich
Attorney, Agent, or Firm—Hubbard, Thurman, Turner, Tucker & Glaser

[57] ABSTRACT

Apparatus for freezing a slug of liquid to form an ice plug in a section of a pipeline for hydrostatic testing purposes. The ice plug is formed by transferring thermal energy from the slug of liquid through the walls of the pipeline to a cryogenic cooling fluid such as liquid nitrogen. A section of the pipeline is filled with liquid and is enclosed by an insulated housing which defines a cooling chamber. The chamber is filled with liquid nitrogen to form a pool around the pipeline. The liquid nitrogen is agitated by discharging a stream of liquid nitrogen or nitrogen vapor through the pool. Heat exchange occurs as a result of sensible heat transfer directly from the surface of the pipeline to the pool of liquid nitrogen. In a preferred embodiment, the liquid nitrogen is discharged uniformly over the surface of the pipeline as the chamber is filled by means of an insulated header which forms a part of the chamber housing.

14 Claims, 12 Drawing Figures

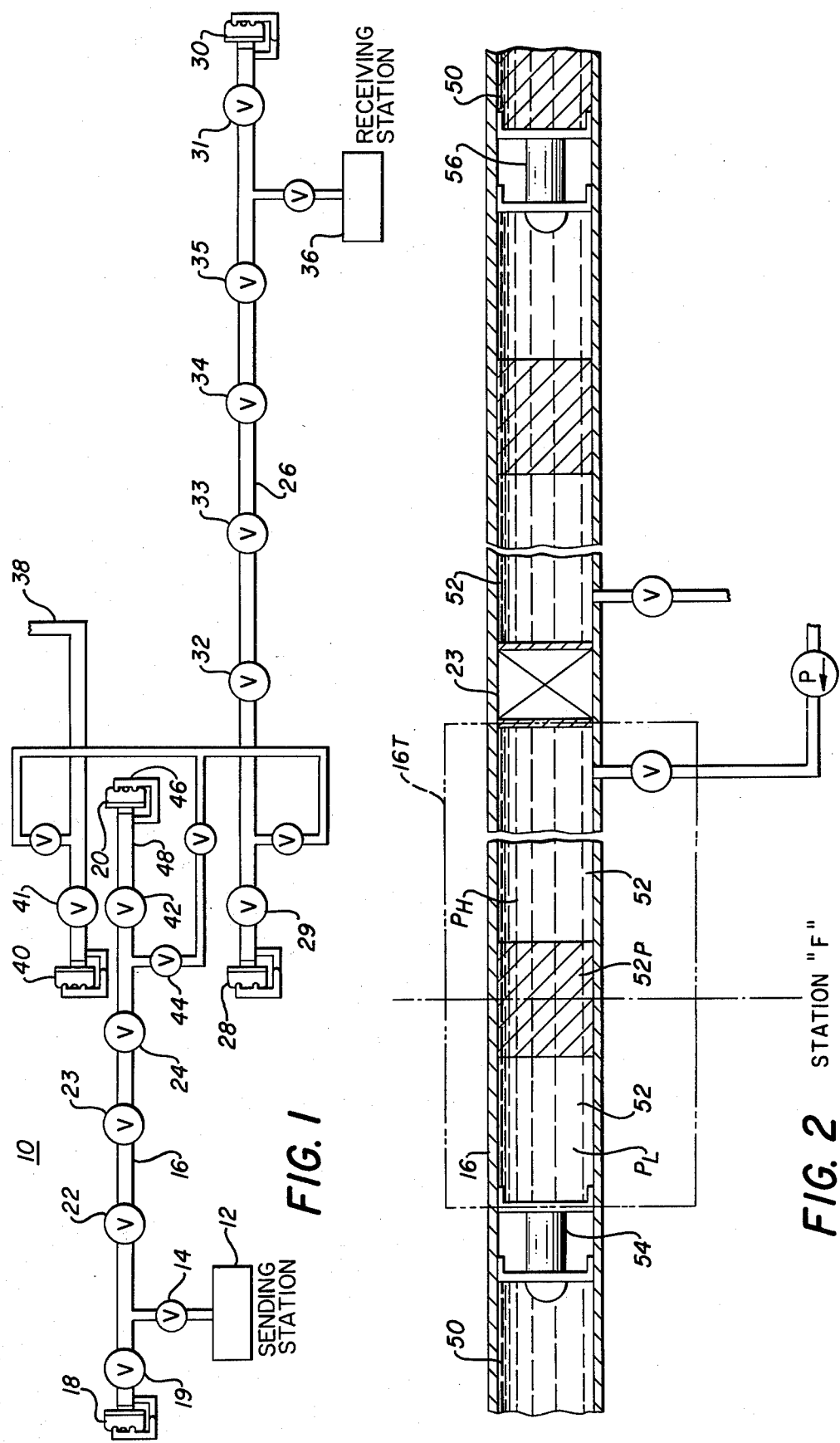

APPARATUS FOR FREEZING A SLUG OF LIQUID IN A SECTION OF A LARGE DIAMETER FLUID TRANSMISSION LINE

CROSS-REFERENCE TO RELATED APPLICATION

This application is a continuation-in-part of application Ser. No. 722,665 entitled "Apparatus for freezing a Slug of Liquid in a Section of a Large Diameter Fluid Transmission Line", filed Sept. 13, 1976 by Beryle D. Brister now U.S. Pat. No. 4,112,706.

BACKGROUND OF THE INVENTION

1. Field of the Invention

The present invention relates generally to the installation, maintenance, and testing of fluid transmission lines, and in particular, to apparatus for freezing a slug of water in a large diameter, high-pressure pipeline for hydrostatic testing and repair or modification purposes.

2. Description of the Prior Art

Large diameter pipelines have been used for many years to transport crude oil, natural gas, gasoline, jet fuel and other petrochemical products over great distances. These pipeline systems gather the petroleum products from the field and transport them to refineries and processing plants. The finished products from the refineries and processing plants are then transported over long distances to market.

These pipelines must be operated at high pressures in order to economically transmit large volumes of fluid. The high operating pressures represent a significant percentage of the maximum pressure which the pipe will withstand before rupture or leak, even if in perfect condition. Because of the nature of the petroleum products, rupture of a pipeline, or even relatively small leaks, can seriously damage the ecology and endanger human life. New pipelines may leak or rupture for a number of reasons, including faulty manufacture of the pipe, faulty weld joints, or damage to the pipe during transportation or installation. Pipelines which have been in use for a long period of time are also subject to leak or rupture due to corrosion.

Because of the serious consequences and relatively high likelihood of ruptures and leaks, rigorous hydrostatic testing is employed to insure the integrity of each new pipeline installation. These hydrostatic testing procedures are exceedingly expensive and represent a very large proportion of the total cost of laying the pipeline. The hydrostatic testing of existing pipelines is even more expensive because the pipeline must be taken out of service for a substantial period of time.

Because of the substantial expense involved, methods for installing and testing new pipelines, or for testing, repairing or modifying existing pipelines are continuously being improved. One such improved method is disclosed in U.S. Pat. No. 3,827,282 issued to B. D. Brister. According to that disclosure, a large diameter pipeline designed to transport fluid products over great distances at high pressures can be tested at pressures equal to the minimum rated yield strength of the pipe by filling a test section of the line with water, freezing a slug of the water in the section by the external application of very low temperatures to form an ice plug, then raising the pressure of the water against the frozen plug to the test pressure, and monitoring a lower pressure on the back side of the frozen plug to detect a faulty ice plug. A combination of pressure cylinders and chill coils filled with a cryogenic cooling fluid such as liquid nitrogen are utilized to form the ice plug by conduction transfer of thermal energy from the slug of water in the test section through the walls of the pipeline and through the walls of the pressure cylinders and the chill coils.

Another improved method is disclosed in co-pending U.S. application Ser. No. 761,789, filed Jan. 24, 1977 by Beryle D. Brister. According to that disclosure, the period that the pipeline is taken out of service for testing or repair is further reduced, and testing and repair procedures are further simplified by freezing the liquid product in situ within the pipeline. By utilizing this method, the time required to strip the line, fill it with water, and refill the line with product after testing and repair is eliminated, and the requirement of an adequate supply of natural surface water is eliminated.

There remains considerable interest in the general improvement of the methods and apparatus which utilize a cryogenic cooling fluid to form the ice plug. In particular, because of increased labor costs and loss of product revenue associated with downtime, a further reduction in the length of time required to establish an ice plug is desired.

SUMMARY OF THE INVENTION

It is an object of the present invention to provide method and apparatus for freezing a slug of liquid (either water or product) in a section of a fluid transmission line by the efficient application of a cryogenic cooling fluid to exterior surface portions of the transmission line in such a manner that an ice plug is formed quickly and is easily sustained during hydrostatic testing, repair or modification without altering the physical characteristics of the transmission line.

According to one aspect of the present disclosure, the invention may be practiced in combination with a fluid transmission line such as a large diameter pipeline for transporting fluid hydrocarbon products over substantial distances at high pressures. In accordance with known hydrostatic testing procedures, such a pipeline system can be tested at pressures equal to the minimum rated yield strength of the pipe by filling a test section of the pipeline with liquid product or water, and freezing a short length or slug of the liquid by the external application of very low temperatures to form an ice plug therein.

According to novel features of the present invention, the test section of the pipeline is thermally isolated from the surrounding environment by means of a detachable housing or envelope having side portions which circumscribe the test section, and end portions which engage the pipeline. The side and end portions define an annular chamber when assembled around the pipeline. Means are disposed within the chamber for distributing the flow of a cryogenic cooling fluid such as liquid nitrogen uniformly over the enclosed surface of the pipeline.

In a preferred embodiment, the distribution means comprise a manifold which includes a number of conduit portions arranged to discharge streams of the cryogenic cooling fluid directly into the chamber and onto the surface of the pipeline. Heat is transferred from the slug of liquid within the pipeline by conduction through the pipeline and by convection from the pipeline through the surrounding pool of liquid cryogenic cooling fluid. Convection currents occur as a result of the heat transfer and are preferably intensified by agitating the pool of liquid cryogenic cooling fluid which surrounds the pipeline. In one aspect of the invention, agitation of the pool of cryogenic cooling fluid is accomplished by discharging a stream of liquid or vaporized cryogenic cooling fluid through the surrounding pool. The convection currents are enhanced by the motion of the liquid or vapor as it is discharged through the pool.

In an important embodiment of the invention, the distribution means comprises an annular header which forms a part of the detachable housing. In this arrangement, the annular header is concentrically disposed within the housing and is insulated therefrom by means of a layer of thermally insulating material or by means of a vacuum chamber disposed intermediate the header and the housing. The header includes an inner wall having a large number of small openings or nozzles through which cryogenic cooling fluid is discharged into the chamber. The openings or nozzles are preferably arranged to provide for uniform distribution of jets or streams of cryogenic cooling fluid over the enclosed surface of the transmission line to minimize thermal shock as the chamber is filled. Heat exchange from the surface of the pipeline to the surrounding pool of liquid cryogenic fluid is enhanced as a result of the agitation which occurs as cryogenic fluid in its liquid or vapor phase is discharged from the header openings and through the surrounding pool.

According to another aspect of the present invention, the heat transfer process is enhanced by diffusing means which is operably disposed in surface-to-surface engagement with the pipeline to uniformly distribute the liquid cooling fluid over the surface of the pipeline and to agitate the pool by the nucleate boiling effect associated with the diffusing means.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 1 is a schematic diagram of a typical pipeline system;

FIG. 2 is a simplified elevational view of a test section of the pipeline shown in FIG. 1;

DESCRIPTION OF THE PREFERRED EMBODIMENT

Figure 3:
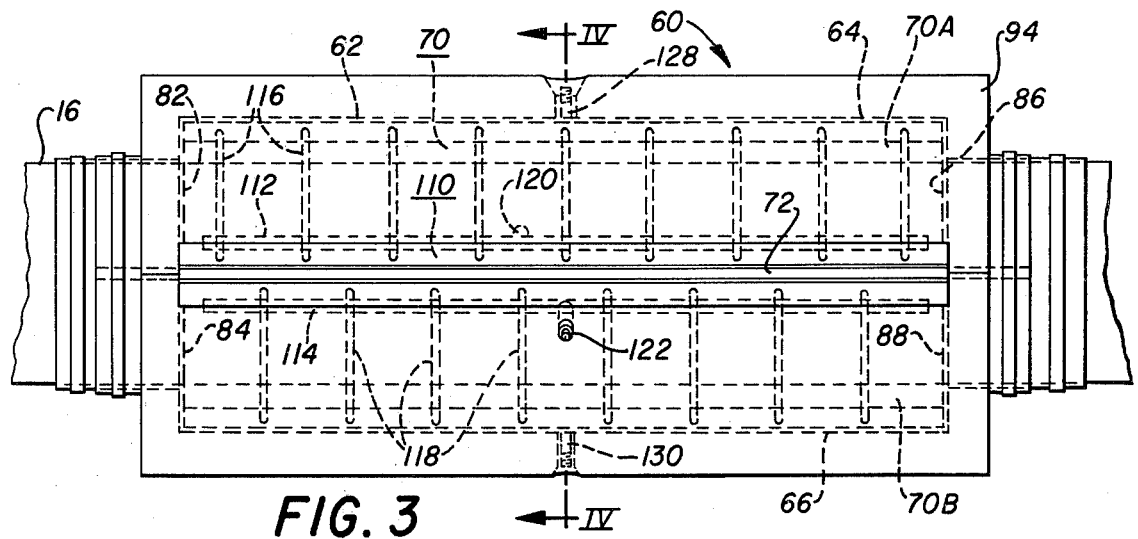
FIG. 3 is a simplified elevational view of a detachable cryogenic housing assembled about the test section of the pipeline illustrated in FIG. 2.

In the description which follows, like parts are marked throughout the specification and drawing with the same reference numerals, respectively.

Referring now to the drawing, a simplified pipeline system is indicated generally by the reference numeral 10 in FIG. 1. The pipeline system 10 includes an originating station 12 for pumping fluid products, typically crude oil, natural gas, or refined petroleum products such as gasoline, jet fuel or the like, into the pipeline. Fluids from the pump station 12 are passed through a valve 14 to a section of the pipeline 16 having launcher-receivers 18 and 20, and mainline valves 22, 23 and 24. A second section of pipeline 26 has launcher-receivers 28 and 30 at each end and mainline valves 32-35. A receiving station represented at 36 may be another pump station, a refinery, a distribution terminal, or the like. A branch line 38 terminates in a launcher-receiver 40. The pipeline 16 may be up to sixty inches or more in diameter and of welded construction. Additional launcher-receivers may be located along the lines 16 and 38 as needed. Terminal valves 19, 29, 31, 41 and 42 are connected in fluid communication intermediate the launcher-receivers 18, 20, 28, 30 and 40, respectively, and the associated pipeline sections 16, 26, and 38 to facilitate launching and receiving operations.

The three launcher-receivers 20, 28 and 40 may be interconnected to either launch or receive batch pigs. The launcher-receivers 20 and 40 will typically be used to receive pigs. The launcher-receiver 28 will typically be used to launch a pig. A pig may be launched from the launcher-receiver 28 by closing valves 42 and 44, opening the end closure means 46 and inserting the pig into the throat of the tube 48.

The gathering system 10 of FIG. 1 may be several hundred miles in length. For example, line section 16 may be eight inches in diameter and may start at an oil field in New Mexico. The line 38 may come from an oil field in West Texas and may also be eight inches in diameter. The line 26 may be ten or twelve inches in diameter, and may extend several hundred miles across the State of Texas to a refinery on the Gulf Coast. The principal product carried by the system 10 may be crude oil. The normal operating pressures of the system might be as high as 700 or 1500 PSI.

The apparatus of the invention will now be described in connection with a suitable method for hydrostatically testing the transmission system 10. One such method in which water is frozen into an ice plug 52P is disclosed in U.S. Pat. No. 3,827,282 issued to Beryle D. Brister on Aug. 6, 1974, and which is hereby incorporated by reference. Another such method in which a slug of liquid hydrocarbon product such as crude oil is frozen into an ice plug is disclosed in copending U.S. application Ser. No. 761,789, filed Jan. 24, 1977, by Beryle D. Brister, and which is hereby incorporated by reference. In the discussion which follows, the apparatus will be described in connection with a testing procedure in which an ice plug is formed by freezing a slug of water in a section of the pipeline. However, it should be understood that the apparatus of the invention is not limited to freezing water and may also be used to good advantage for freezing a slug of liquid hydrocarbon product such as crude oil in the section of pipeline.

Referring now to FIG. 2, in accordance with the general method disclosed by U.S. Pat. No. 3,827,282, hydrostatic testing of a pipeline 16 which is in service, that is, carrying a fluid product 50 which may be for example, crude oil, is initiated by displacing the product 50 with water 52 by means of a standard batch pig 54 which may be launched from any convenient launcher receiver, for example, launcher receiver 20 behind the fluid product 50 using the water 52 as the propelling fluid. A second batch pig 56 is launched behind the water 52 and ahead of the product 50. An adequate amount of the water 52 is injected into the line 16 to fill the section 16T which is to be tested. Next, a short length or slug of the water in the line 16 is frozen to form an ice plug 52P at a predetermined position (e.g., Station "F") along the line 16.

Figure 4:
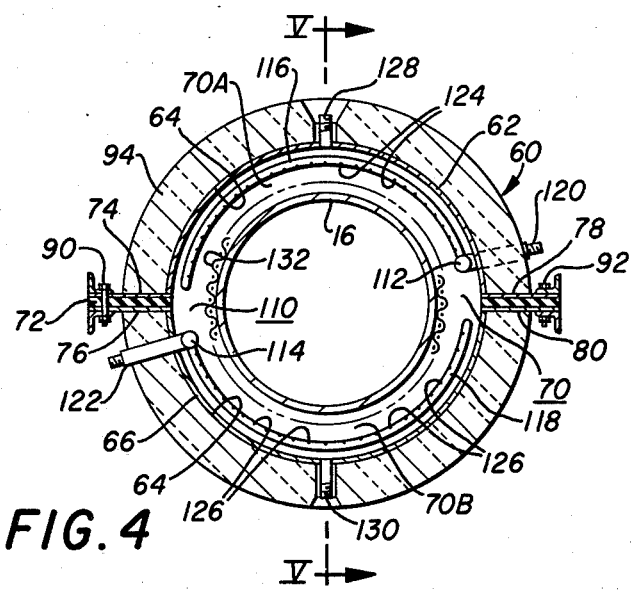
FIG. 4 is a sectional view taken along the line IV—IV of FIG. 3.
Figure 5:
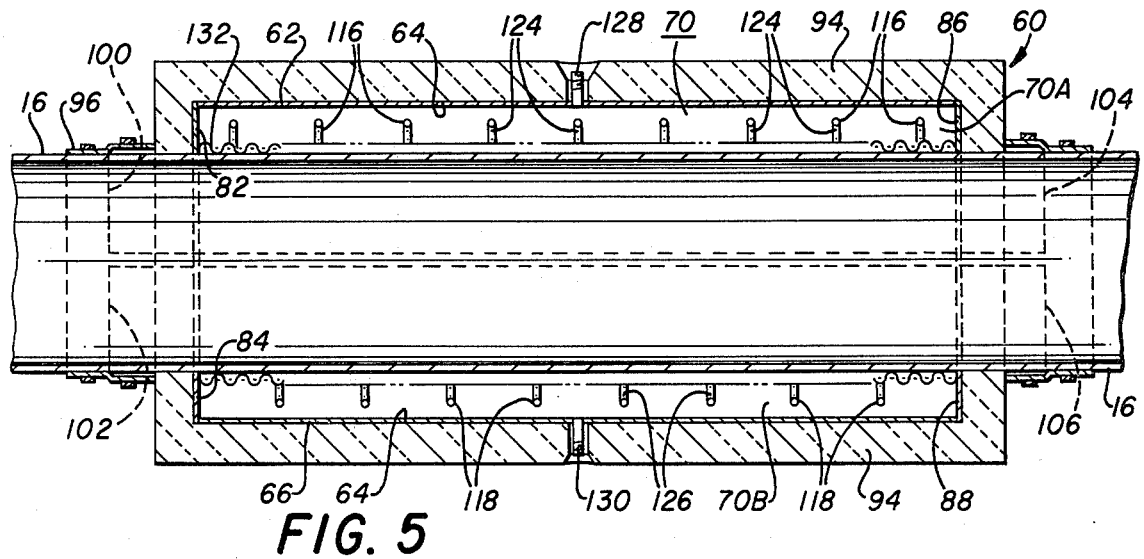
FIG. 5 is a sectional view of the apparatus shown in FIGS. 3 and 4 taken substantially along the line V—V of FIG. 4.

The ice plug 52P may be frozen using the detachable housing apparatus indicated generally by the reference numeral 60 in FIGS. 3, 4 and 5. The detachable housing 60 comprises an envelope or box, indicated generally by the reference numeral 62, having cylindrical halves or shells 64 and 66 which are assembled around the pipe 16 to define an annular chamber 70 having upper and lower chamber regions for storing the liquid cooling fluid. Any suitable fluid sealing means 72 having good low temperature properties may be used along the seam between the halves 64 and 66 to seal the chamber 70. The sealing material 72 is disposed intermediate of longitudinally extending flange portions 74, 76 and 78, 80 of each half section 64 and 66 respectively. The half sections 64, 66 also include radially extending flange portions 82, 84 and 86, 88 which are engaged with the outer periphery of the pipeline 16. The side portions 64, 66 and end portions 82, 84, 86 and 88 when assembled around the pipeline 16 define the annular chamber 70. The inner face of the sealing means 72 and the longitudinal flanges 74, 76, 78 and 80 are secured together by any suitable means, for example, a bolt 90 and nut 92.

A layer 94 of thermal insulation is disposed on the outer surface of the half shells 64 and 66. The insulation preferably comprises polyurethane foam which is bonded to the outer surface of the cylindrical half shells. However, other foams having good thermal insulation properties such as polystyrene, rubber, and silicones may also be used.

The radially extending end flange portions 82, 84, 86 and 88 preferably include longitudinally flared portions 100, 102, 104 and 106 on either end of the envelope 62 to complete the fluid-tight seal around the pipe 16. The flared portions 100, 102, 104 and 106 may be secured in a compression union to the pipe 16 by means of metal bands (not shown).

A manifold, indicated generally at 110, is disposed within the chamber 70 for distributing jets or streams of the cryogenic cooling fluid substantially uniformly throughout the chamber and onto the enclosed surface of the pipeline. In the preferred arrangement described herein, the manifold 110 comprises an upper half 112 and a lower half 114 which correspond respectively with the upper shell portion 64 and the lower shell portion 66 of the envelope 62. Each manifold 112, 114 is a straight tubular member having a number of distribution openings to which a plurality of curved distribution conduit members 116 and 118 are joined in fluid communication. Each manifold half 112 and 114 is secured in fluid communication with an intake port 120 and 122 for admitting the flow of cryogenic cooling fluid into the chamber 70. As seen in FIG. 4 of the drawing, the intake ports 120 and 122 project radially through the walls 64 and 66 of the envelope 62 and also through the insulation layer 94. The conduit members 116 and 118 are seen to be generally curved members which conform generally with the curvature of the centrally disposed pipeline 16.

Each distribution conduit includes a number of openings or discharge ports 124 and 126 corresponding respectively to the upper and lower halves of the chamber 70. The openings 124, 126 are arranged to discharge cooling fluid directly into the chamber and onto the surface of the pipeline 16, and preferably in a direction substantially at a right angle with respect to the surface of the pipeline 16. According to an important aspect of the invention, it is preferred that the manifolds 112 and 114 not be connected in fluid communication with one another so that it is possible to discharge cooling fluid of differing qualities and flow rates through the two principle regions of the chamber 70 which are required to implement a method of the present invention as will be discussed in detail hereinafter. However, the manifolds 112, 114 may be used to good advantage by connecting them together in fluid communication either internally or by external coupling means (not shown) for discharging cryogenic cooling fluid in either liquid or vapor state through both manifolds simultaneously.

During the exchange of heat from the slug of water within the pipeline 16 to the surrounding cooling fluid within the chamber 70, large volumes of liquid cooling fluid will evaporate and form vapor. This vapor is exhausted from the chamber 70 by means of an exhaust port 128 which projects through the envelope wall 64 and also through the surrounding insulation 94. The vapor may be exhausted into the surrounding atmosphere; however, it is preferably exhausted beyond the end portions of the envelope walls 64, 66 to chill the outer surface of the exposed and uninsulated pipeline. A drain valve 130 is provided for purging the chamber 70 after completion of a freeze operation.

In operation, the apparatus 60 provides a fluid-tight, thermally insulated chamber into which a cryogenic cooling fluid such as liquid nitrogen is discharged until at least a portion of the enclosed transmission line 16 is submerged in a pool of the liquid cooling fluid. The means by which heat is transferred from the surface of the pipe 16 to the surrounding pool of cooling fluid is by convective heat transfer or sensible heat flow in which relatively hot and cold portions of the surrounding liquid cryogenic fluid are mixed when the fluid is placed in motion. Most of the heat exchange occurs as a result of transfer directly from the surface of the pipe 16 to the surrounding liquid by the action of convection currents. The convection currents are established according to the teachings of the present invention by discharging a stream of liquid or vaporized cooling fluid through the intake port 122 so that it is discharged into the chamber 70 and "bubbles" through the surrounding annular pool of liquid cooling fluid. The convection currents result from the vigorous agitation of the liquid by the motion of the liquid or vapor bubbles. The overall exchange of heat is related to the volume of the liquid or vapor discharged, the frequency of release, and how well the cooling fluid "wet" the surface of the pipe 16.

For rapid heat transfer, the entire surface of the enclosed pipe 16 should be constantly wetted and saturated with the liquid cryogenic cooling fluid. This effect is achieved in part by the discharge of streams of liquid cooling fluid from the openings 124 and 126 of the conduit members 116 and 118. It has been determined, however, that the distribution of cooling fluid over the surface of the pipe 16 is greatly enhanced by the provision of a layer 132 of a permeable material for diffusing the streams of liquid cooling fluid which are discharged onto the pipeline 16. The permeable material preferably comprises a material which is readily wetted by the cooling fluid. In a preferred arrangement, the layer 132 of permeable material is a sleeve of woven material such as a screen wire mesh. However, a suitable diffusing means may comprise a perforated metal webb or alternatively a wick matrix of stainless steel or glass fibers. Other suitable materials which have permeable properties may be used to good advantage. Best results have been obtained when utilizing the permeable material described above disposed in surface-to-surface compressive engagement with the pipeline 16. Agitation of the surrounding pool is promoted by the generation of bubbles in response to nucleate boiling associated with the permeable layer 132.

In using the apparatus 60 to freeze an ice plug, the pipeline 16 is uncovered at the point to be frozen only for a sufficient length to install the apparatus 60 around it. The pipeline 16 is filled with water which is preferably maintained in a static condition unless, of course, it is impossible to do so because of a leak in the line. The protective coating usually covering the pipeline 16 is preferably removed in the area where the envelope 62 is to be installed. After the envelope 62 has been bolted around the pipe, the entire apparatus 60 is covered with an insulated shroud or blanket 140 to increase the rate of heat transfer at the interface of the envelope 62 and pipeline 16 (see FIG. 6). After the test section of the pipeline has been enclosed by the thermally insulated chamber 70, liquid nitrogen, or some other suitable cryogenic cooling fluid, is discharged into the chamber 70 until at least a portion and preferably all of the enclosed pipeline 16 is submerged in a pool of the liquid nitrogen. Liquid nitrogen is discharged into the chamber 70, as indicated by the arrows 143 and 144, preferably until the chamber 70 is substantially filled by the liquid nitrogen. The flow of liquid nitrogen into the chamber 70 is terminated during a predetermined interval while the liquid nitrogen is evaporating in response to the transfer of heat from the enclosed pipeline 16, with the vapor being exhausted through the exhaust port 128 into a manifold 146, as indicated by arrows 147, where it is distributed by means of a pair of conduits 148 and 150 for discharge under the insulated blanket 140 which covers the end portions of the assembly 60, as indicated by arrows 149, 151. Additional liquid nitrogen is discharged into the chamber 70 as needed to replenish the evaporated cooling fluid.

The rate and frequency at which liquid nitrogen should be discharged into the apparatus 60 to establish the ice plug 52P may be determined by sensing the temperature of the surface of the enclosed pipeline 16 as the chamber 70 is filled. This function may be performed manually or automatically with a temperature indicator 152 which is responsive to temperature dependent changes within a temperature probe 154 which is disposed in surface-to-surface engagement with the enclosed pipeline 16 and which is suitably insulated from the surrounding pool of liquid nitrogen by means of an insulating layer 156. The probe 154 is electrically connected to the temperature indicator 152 by means of a bundle of conductors 158. Additional liquid nitrogen is discharged into the chambers 70 to replenish the evaporated nitrogen when the temperature of the pipeline 16 increases to a predetermined level above the temperature as indicated by the temperature indicator 152 when the chamber 70 is substantially full of liquid nitrogen.

For automatic control of the liquid nitrogen flow, a level controller 159 is disposed in the chamber 70. The level controller 159 may be a displacement transducer of conventional design which provides an electrical control signal 161 in response to displacement of the controller with respect to an arbitrary reference position. The level control signal 161 and a temperature control signal 163 form the input for a flow control unit 165. A flow control valve 167 is responsive to a flow control signal 169 from the control unit 165 to meter the quantity of liquid nitrogen required to maintain a prescribed liquid level in the chamber 70. The flow control signal 169 is responsive to a predetermined function of the liquid level control signal 161 and pipeline temperature control signal 163 to provide positive control of the level of liquid nitrogen in the chamber 70.

An important step in the hydrostatic testing and repair or modification procedure which utilizes an ice plug is the determination of the point in time after the freezing process has begun that a suitable ice plug 52P has been formed within the test section 16T of the pipeline 16. A method for confirming the existence of an ice plug within the test section 16T is to sense the rate of formation of crystals within the slug of water as it freezes. This is carried out in the present invention by means of a sound indicator 160 which detects either the amplitude or the frequency of the noise generated within the freezing slug of water as crystals of ice expand and collide with one another as the slug freezes. An electrical signal proportional to the noise generated by the colliding ice crystals is generated by a transducer 162 which is disposed in contact with the outer surface of the pipeline 16 and is electrically connected to the sound indicator 160 by a bundle of conductors 164. It has been experimentally verified that during the process of freezing the slug of water within the test section 16T, the frequency and amplitude of the noise generated by the colliding ice crystals increases rapidly as the freezing process begins and then diminishes continuously and approaches a nominal level after the ice plug has been formed. Therefore an operator can utilize the temperature indications and the sound indications to determine at what rate the liquid nitrogen should be discharged into the chamber and at what point commencement of hydrostatic testing can commence with confidence that a stable ice plug has been formed.

An important method of the present invention is the step of agitating the liquid nitrogen which is formed in a pool around the pipeline 16. This is accomplished as discussed above by discharging a stream of liquid nitrogen or nitrogen vapor through the pool of liquid nitrogen as indicated by the arrows 143 in FIG. 6. Agitation of the pool of liquid nitrogen which surrounds the enclosed section of pipeline may occur naturally due to the buoyant movement through the pool by bubbles of nitrogen vapor which are produced in response to heat transferred from the submerged portions of the pipeline to the surrounding liquid. However, stronger agitation may be desired during the early stages of the freezing process which may be easily accomplished by the discharge of liquid nitrogen or nitrogen vapor through the inlet port 122.

Although it is generally desirable to form the ice plug as rapidly as possible, because of structural or material limitations associated with the metal comprising the pipeline 16 it is a good practice to precool the test section prior to the discharge of liquid nitrogen into the chamber 70 in order to minimize thermal shock. This may be accomplished by discharging nitrogen vapor into the chamber through the inlet port 120 for a predetermined period prior to the step of discharging liquid cooling fluid into the chamber so that the relatively warm surface of the pipeline (approximately 300° Kelvin) is decreased toward the relatively low temperature of boiling nitrogen (approximately 77° Kelvin). Thermal shock is also minimized as the chamber is filled by discharging the liquid nitrogen substantially uniformly over the enclosed section. Uniform distribution of fine jets of liquid nitrogen is provided by the discharge openings 124, 126 (FIGS. 4, 5) and openings 214 (FIG. 10) which are uniformly spaced relative to each other and relative to the surface of the enclosed section 16.

According to a preferred embodiment, the ice plug 52 is formed by means of a detachable housing 166 constructed as shown in FIGS. 7–12. The detachable housing 166 defines an annular cooling chamber indicated generally by the reference numeral 168. The cooling chamber 168 is enclosed by cylindrical halves or shells 170, 172 which in combination form the housing 166. Layers 174A, 174B of thermal insulation are secured to the exterior surface of the shells and a pair of cylindrical headers 176A, 176B are secured to the interior surface of the cylindrical halves 170, 172, respectively. The annular spaces intermediate the headers 176A, 176B and shells 170, 172 constitute separate header chambers 178A, 178B for receiving a volume of cryogenic cooling fluid for distribution into the cooling chamber 168. Any suitable fluid sealing means 180 may be used along the seam between the cylindrical shells 170, 172 to seal the cooling chamber 168. The sealing material 180 is disposed intermediate of longitudinally extending flange portions 182, 184 and 186, 188 of each cylindrical shell section 170, 172, respectively. The cylindrical shell sections 170, 172 also include radially extending flange portions 190, 192 and 194, 196 which are engaged with the outer periphery of the pipeline 16. The inner face of the sealing means 180 and the longitudinal flanges 182, 184 and 186, 188 are secured together by any suitable means, for example a bolt and nut assembly 198, 200.

The cylindrical shell sections 170, 172 preferably comprise molded fiberglass material. However, other materials such as aluminum which are suitable for cryogenic service may also be used to good advantage in the construction of the cylindrical shell sections.

The thermal insulation layers 174A, 174B are disposed on the outer surface of the cylindrical shells 170, 172, respectively. The insulation preferably comprises polyurethane foam which is bonded to the outer surface of the cylindrical half shells. However, other foams having good thermal insulation properties such as polystyrene, rubber, and silicones may also be used.

Figure 9:
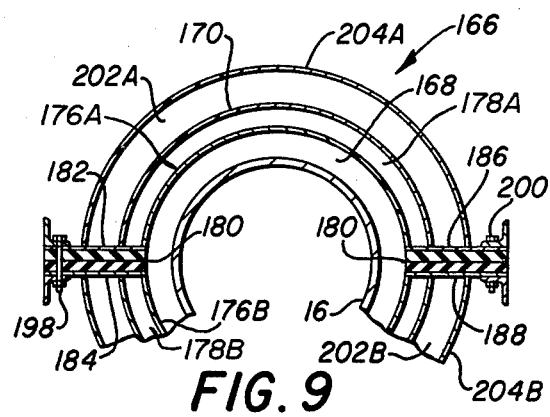
FIG. 9 is a view similar to FIG. 8 which illustrates an alternate embodiment of a detachable housing constructed according to the invention.

According to an important embodiment of the invention, the thermal insulation may be provided by vacuum chambers 202A, 202B as shown in FIG. 9 of the drawing. The vacuum chambers 202A, 202B are each formed by a cylindrical annulus which is formed intermediate the cylindrical wall of the shells 170, 172 and an outer cylindrical wall 204A, 204B. The radial extending end flange portions 190, 192 and 194, 196 preferably include longitudinally flared portions 206, 208 and 210, 212 on either end of the detachable housing 166 to complete the fluid tight seal around the pipe 16. The flared portions 206, 208, 210 and 212 may be secured to the pipe in a compression union by means of metal bands (not shown).

Figure 7:
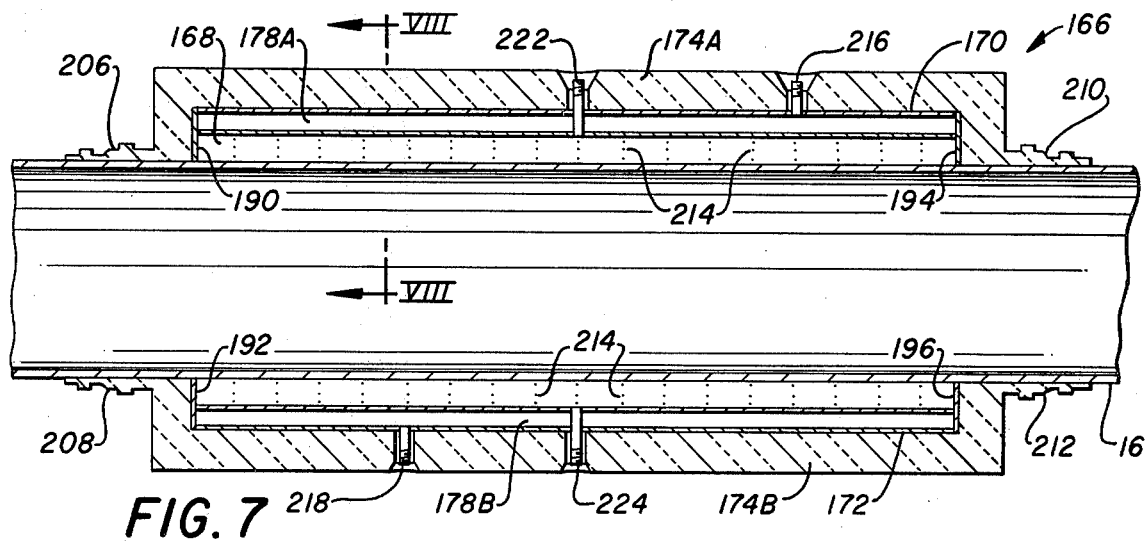
FIG. 7 is a side elevational view, partly in section, which illustrates a preferred embodiment of a detachable housing constructed according to the invention.
Figure 8:
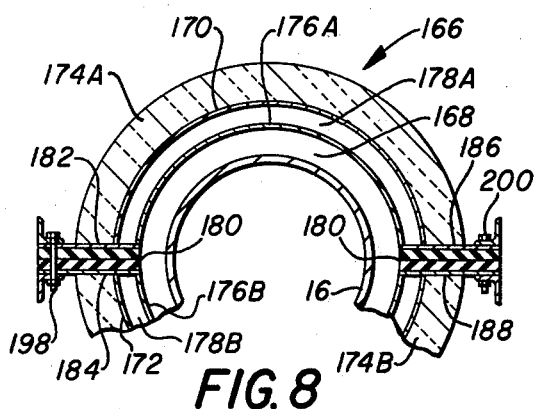
FIG. 8 is a sectional view taken along the line VIII—VIII of FIG. 7.
Figure 12:
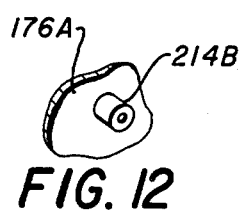
Figure 11:
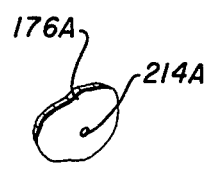
FIG. 11 is an elevation view of a portion of the insulated header of FIG. 7 showing a cryogenic fluid discharge opening; and, FIG. 12 is a view similar to FIG. 10 of a cryogenic fluid discharge nozzle.

Referring now to FIGS. 7, 11 and 12, the cylindrical headers 176A, B are provided with a number of discharge openings 214 which are preferably uniformly distributed across each header. The discharge openings may be formed by means of apertures 214A as shown in FIG. 11, or they may be formed by nozzles 214B as shown in FIG. 12 for directing a fine jet of cryogenic cooling fluid onto the pipeline 16.

Figure 10:
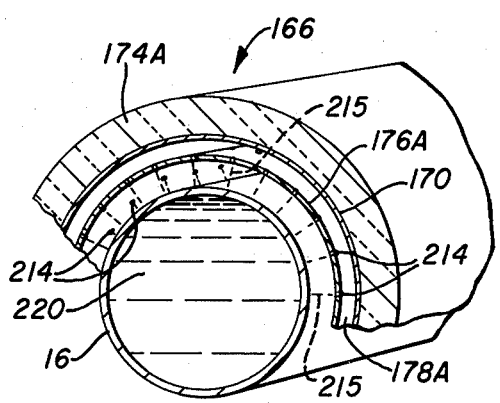
FIG. 10 is a perspective view, partly in section, which illustrates the operation of the insulated header shown in FIG. 7.

Each of the cylindrical half shells 170, 172 is provided with intake ports 216, 218 for admitting the flow of cryogenic cooling fluid into each header chamber 178A, 178B, respectively. As seen in FIG. 7 of the drawing the intake ports 216, 218 project radially through the walls 170, 172 of the housing 166 and also through the insulation layers 174A, 174B. Cryogenic cooling fluid is discharged into the header chambers 178A, 178B under pressure and are discharged through the openings 214 as illustrated in FIG. 10. As shown in FIG. 10, the openings 214 are arranged to discharge the cryogenic cooling fluid directly into the chamber and onto the surface of the pipeline 16, and preferably in a direction substantially at a right angle with respect to the surface of the pipeline.

According to an important aspect of the invention, it is preferred that the header chambers 178A, 178B not be connected in fluid communication with one another so that it is possible to discharge cryogenic cooling fluid of different qualities and flow rates in the upper and lower parts of the chamber 168 in order to implement a method of the present invention. However, the header chambers 178A, 178B may be used to good advantage by connecting them together in fluid communication either internally or by external coupling means (not shown) for discharging cryogenic cooling fluid in either liquid or vapor state through both of the header chambers simultaneously.

During the exchange in heat with a slug of water 220 within the pipeline 16 to the surrounding cryogenic fluid within the cooling chamber 168, large volumes of liquid cooling fluid will evaporate and form vapor. This vapor is exhausted from the cooling chamber 168 by means of an exhaust port 222 which projects through the header chamber 178A and also through the thermal insulation 174A. The vapor may be exhausted into the surrounding atmosphere; however, it is preferably exhausted onto the end portions of the detachable housing 166 to chill the outer surface of the exposed and uninsulated pipeline.

In operation, the detachable housing 166 provides a fluid tight, thermally insulated chamber into which a cryogenic cooling fluid such as liquid nitrogen may be discharged until at least a portion of the enclosed transmission line 16 is submerged in a pool of a liquid cooling fluid. The means by which the heat is transferred from the surface of the pipe 16 to the surrounding pool of cooling fluid is by convection heat transfer or sensible heat flow in which relatively hot and cold portions of the surrounding fluid are mixed when the fluid is placed in motion. The openings 214 are arranged to provide for uniform distribution of jets or streams 215 (FIG. 10) of the cryogenic cooling fluid over the enclosed surface of the transmission line to minimize thermal shock as the chamber 168 is filled. Therefore, the openings 214 are preferably arranged in a uniform pattern so that the cryogenic cooling fluid may be discharged substantially uniformly over the enclosed section of transmission line. A further advantage of this arrangement is that cryogenic cooling fluid in either its liquid or vapor state may be discharged through the pool of liquid cooling fluid to enhance the natural convection currents associated with the sensible heat flow by agitating the pool of liquid as additional vapor or liquid cooling fluid is discharged through the pool.

As previously discussed, the distribution of cooling fluid over the enclosed surface of the pipe 16 may be greatly enhanced by the provision of a layer of permeable material for diffusing the streams 215 of liquid cooling fluid which are discharged onto the pipeline. The provision of diffusion means also enhances the agitation of the surrounding pool of liquid cryogenic cooling fluid because of nucleate boiling associated with the diffusion means.

A drain valve 224 is provided for purging the chamber 168 after completion of a freeze operation.

An analytical study has been performed which clearly indicates that the stresses which develop within the pipe section during the freezing procedure do not have a detrimental effect on the structural integrity or pressure load capacity of the pipe. Estimates of pipe stresses based on finite difference calculations involving the behavior of a mathematical model in response to boundary conditions associated with the freezing procedure were consistent with known exact solutions of idealized freezing processes. In particular, the hoop stresses or tangential stresses were found to decrease due to the freezing process in the near vicinity of the ice plug. Since hoop stresses limit the pressure load capacity of the pipe, the diminished hoop stress effect is a favorable effect of the freezing process. Axial stresses were found to increase due to the longitudinal bending moment created by temperature gradients. However, the axial stress effect was not considered to be significant since longitudinal stresses due to pressure loading are substantially less than hoop stresses; therefore, the pressure load capacity of the pipe would only be effected for very steep axial temperature gradients. The bending stresses generated in the freeze zone effect the pressure load capacity substantially less than membrane stresses because of the allowable variation of bending stresses from the inside wall to the outside wall. For example, according to ASME Boiler and Pressure Vessel Standard, Section III Division I, as much as 1.5 times higher stresses are allowed for section bending stresses as compared to membrane stresses. The effect of the longitudinal bending stresses are not due to sustained loading but last for the relatively short duration of the freezing process. Therefore, its influence on pressure load capacity is not significant.

Field experience and laboratory testing have confirmed that the properties of a pipe pressurized and frozen by the method and apparatus of the present invention are not altered in any way. In a recent test program, test specimens were removed from an unpressurized section, a pressurized section, and from a frozen section and were subjected to standard tension tests, impact tests, and metallographic examinations. The tension test data revealed only normal scatter at all three locations. The impact test data revealed no shift of transition temperature; the data from all tests fitted within a normal scatter band. The microstructures at all locations were found to be similar, consisting of laminar pearlite in a matrix of ferrite, with a low level of nonmetallic inclusions. No microfissures or any other unusual structural conditions were detected.

The freezing process can be greatly accelerated by diffusing the liquid nitrogen over at least a portion of the enclosed pipeline 16 and preferably uniformly over its entire enclosed surface. The liquid nitrogen may of course be diffused over the surface of the enclosed pipeline by simply directing a stream of the liquid nitrogen directly onto the surface of the pipeline. However, the liquid nitrogen is more uniformly and completely diffused over the surface by directing a stream of liquid nitrogen directly onto the surface of a permeable medium such as the woven screen 132 which is disposed directly on the enclosed surface area of the enclosed pipeline 16. In addition to its ability to diffuse the liquid nitrogen over the surface of the enclosed pipeline 16, the permeable medium 132 also operates to agitate the pool of liquid nitrogen which surrounds the enclosed pipeline by the buoyant movement through the pool of liquid nitrogen by bubbles of vaporized nitrogen which are produced in response to heat transferred from the submerged portions of the enclosed pipeline at irregularities in the surface of the permeable medium 132 disposed on the submerged portions of the transmission line.

Figure 6:
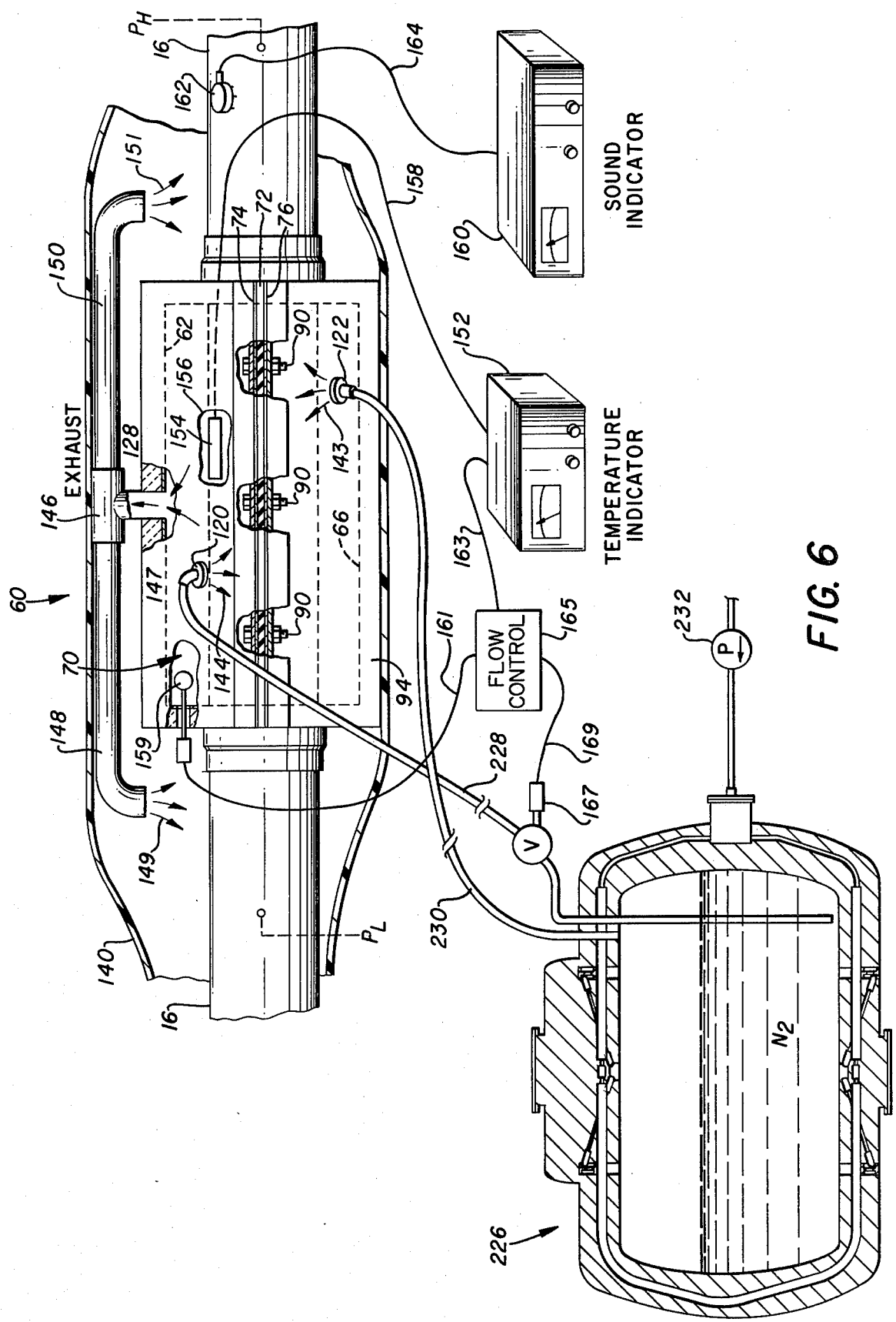
FIG. 6 schematically represents the overall method and apparatus of the present invention.

Liquid nitrogen is the preferred cooling fluid for use with the apparatus as described herein. It is a safe refrigerant which is rather inactive chemically and is neither explosive nor toxic. Furthermore it is widely available commercially and is easily prepared by the fractionation of liquid air. A large volume of liquid nitrogen may be transported safely and easily in the field by means of a portable container 226 which is illustrated in FIG. 6. A liquid line 228 connected in fluid communication with the liquid input port 120 and a vent line 230 is connected in fluid communication with the vapor input port 122 for discharge of vapor into the chamber 70. A pump 232 controls the rate of flow of liquid nitrogen and vapor through the liquid line 228 and vent line 230.

Once it is believed that a plug has been frozen, taking into account the temperature indications from indicator 152 and the sound indications from indicator 160, hydrostatic testing can commence with pressure on one side of the ice plug ($P_H$) being raised slowly to test its integrity (see FIGS. 2, 6). If the back side pressure ($P_L$) does not increase as additional water is pumped into the test section 16T, this indicates that the ice plug is solidly frozen. Additional water is then pumped into the test section 16T until the desired test pressure is achieved therein. The test pressure for above ground piping, such as the launcher-receiver 18, and the discharge plumbing associated with the station 12 will typically be from 2000 PSI to 2800 PSI which is somewhat higher than the normal test pressures for the buried portions of the line 16.

After the test pressure is achieved, it is maintained for a prolonged period, typically 24 hours. Any variation in pressure whatsoever not attributable to changes in temperature indicates a leak. Any rise in the pressure $P_L$ coupled with a loss of pressure in the test section indicates that the ice plug has slipped along the line or that the ice plug has leaked. A loss of pressure on the back side not coupled with the loss of pressure on the test side indicates that a leak has occurred between the ice plug 52P and the main line valve 23. In the event of a leak, the leak must be found, repaired, and a successful test completed before proceeding to the next test section.

After a successful test, the plug 52P is allowed to thaw and the slug of water 52 is advanced to another position along the line for further testing. Thawing of the ice plug 52 is facilitated by opening the drain valve 130 in the lower half 66 of the envelope 62 to allow the liquid nitrogen to drain rapidly from the chamber 70.

From the foregoing description of preferred embodiments of the invention, those skilled in the art will appreciate that the method and apparatus of the present invention provides an ice plug much faster and with more confidence than previous arrangements. Because the governing mechanism in the heat transfer process is by convective heat transfer from the surface of the pipeline directly to the pool of liquid cryogenic cooling fluid rather than by conduction through an intermediate body the ice plug is formed much more rapidly and is sustained during the hydrostatic testing, repair or modification procedures with less effort as compared with prior art arrangements.

Although preferred embodiments of the invention have been described in detail, it should be understood that various changes, substitutions, and alterations can be made therein without departing from the spirit and scope of the invention as defined by the appended claims.

What is claimed is:

1. Apparatus for freezing a slug of liquid in a section of fluid transmission line comprising, in combination:
   a detachable housing having side portions for enclosing a section of the transmission line and end portions for engaging in sealing relation with opposite ends of the transmission line section, the side and end portions defining a cooling chamber when assembled around the transmission line, the cooling chamber being operable when filled by discharging cryogenic cooling fluid from spaced fluid distribution means, to confine a volume of said cryogenic cooling fluid in its liquid phase in intimate contact with the exterior surface of the section of transmission line enclosed by the housing, said detachable housing including inlet port means for admitting said cryogenic cooling fluid into the cooling chamber and exhaust port means for discharging said cryogenic cooling fluid out of the cooling chamber; and,
   said fluid distribution means including header means radially spaced from the transmission line and connected in fluid communication with the inlet port means for discharging said cryogenic cooling fluid into the cooling chamber and onto the enclosed surface of the transmission line.

2. Apparatus as defined in claim 1, the fluid distribution means comprising said header means enclosed within the detachable housing and radially spaced from the enclosed surface of the transmission line, the header means having wall portions defining a header chamber, the header chamber being connected in fluid communication with the inlet port means for receiving said cryogenic cooling fluid, a wall portion of the header means having multiple fluid discharge openings disposed in fluid communication with the header chamber for discharging multiple streams of said cryogenic cooling fluid into the cooling chamber and onto the enclosed surface of the transmission line.

3. Apparatus as defined in claim 2, the combination including nozzle means connected in fluid communication with the fluid discharge openings for accelerating and directing said cryogenic cooling fluid as it is discharged from the openings into the cooling chamber.

4. The apparatus as defined in claim 1, the side portions of said detachable housing comprising a first cylindrical half shell and a second cylindrical half shell, the first and second shells each including longitudinally extending flange portions which cooperate to permit mating engagement of said shells to each other to form a closed structure, the end portions of said housing comprising radially extending flange portions for mating engagement with opposite ends of the transmission line section enclosed by the housing.

5. The apparatus as defined in claim 1, the combination further including a layer of thermal insulation disposed on said side and end portions for thermally insulating the cooling chamber.

6. The apparatus as defined in claim 5 wherein the layer of thermal insulation comprises polyurethane foam which is bonded to the outer surface of the side and end portions.

7. The apparatus as defined in claim 1, the combination further including a vacuum chamber disposed intermediate the side portions and fluid distribution means for thermally insulating the cooling chamber.

8. The apparatus as defined in claim 1, said inlet port means comprising a first inlet port for admitting a flow of said cryogenic cooling fluid into a first region of the cooling chamber and a second inlet port for admitting a flow of said cryogenic cooling fluid into a second region of the cooling chamber, said fluid distribution means comprising first and second header means each having wall portions defining a header chamber connected in fluid communication with said first and second inlet ports, respectively, a wall portion of each header means having multiple fluid discharge openings disposed in fluid communication with each header chamber, respectively, for discharging multiple streams of said cryogenic cooling fluid into the first and second regions of the cooling chamber, respectively, and onto the enclosed surfaces of the transmission line associated with the first and second cooling chamber regions, respectively.

9. Apparatus as defined in claim 8, further comprising, in combination:
   a reservoir;
   a supply of said cryogenic cooling fluid in liquid state and in vapor state disposed in said reservoir;
   means for conveying liquid cooling fluid from said reservoir connected in fluid communication with said first inlet port;
   means for controlling the rate of liquid said cryogenic cooling fluid flow into said cooling chamber;
   means for conveying said cryogenic cooling fluid vapor from said reservoir connected in fluid communication with said second inlet port opening;
   means for controlling the rate of cooling fluid vapor flow into said chamber; and,
   means for detecting the freezing of a slug of liquid disposed in the section of transmission line enclosed by said envelope.

10. Apparatus as defined in claim 9 wherein said cryogenic cooling fluid is nitrogen and the slug of liquid in the transmission line section is water.

11. Apparatus as defined in claim 9 wherein said cryogenic cooling fluid is nitrogen and the slug of liquid in the transmission line is a liquid hydrocarbon product.

12. The apparatus as defined in claim 1, the side and end portions of the detachable housing comprising molded fiberglass.

13. In combination;
- a transmission line for transporting fluid products;
- a slug of water disposed in a selected section of said transmission line;
- a detachable, thermally insulated housing having upper and lower portions corresponding to upper and lower surface portions of the transmission line defining a cooling chamber disposed around the selected transmission line section and having first and second inlet ports for admitting cryogenic cooling fluid into the cooling chamber;
- first fluid distribution means including a second header assembly connected in fluid communication with the first inlet port for discharging cryogenic cooling fluid into the cooling chamber and for distributing the cryogenic cooling fluid substantially uniformly over the enclosed upper surface of the transmission line;
- second fluid distribution means including a second header assembly connected in fluid communication with the second inlet port for discharging cryogenic cooling fluid into the cooling chamber and for distributing the cryogenic cooling fluid substantially uniformly over the enclosed lower surface of the transmission line;
- means for exhausting vapor from the cooling chamber into the surrounding atmosphere;
- a reservoir of cryogenic cooling fluid in liquid and vapor states;
- a first supply line interconnecting said reservoir and the first fluid distribution means to discharge cryogenic cooling fluid in either liquid or vapor state;
- a second supply line interconnecting said reservoir and the second fluid distribution means to discharge cryogenic cooling fluid in either liquid or vapor state;
- means for selectively charging said supply lines with cryogenic cooling fluid in either liquid or vapor state.

14. Apparatus for freezing a slug of liquid in a fluid transmission line section comprising, in combination:
- a detachable housing having upper and lower half-cylinder side portions for circumscribing the transmission line section and semi-circular end portions connected to the half-cylinder side portions for engaging in sealing relation with opposite ends of the transmission line section, the half-cylinder side portions each having longitudinal flanges which cooperate to permit sealing engagement of the side portions to each other, the end portions including flange portions for sealing engagement with opposite ends of the transmission line section, the side portions and end portions when assembled around the transmission line section defining an annular cooling chamber, and the housing having an exhaust port connected in fluid communication with the cooling chamber for venting cryogenic cooling fluid in its vapor state into the surrounding atmosphere;
- a first header assembly concentrically disposed within the detachable housing and secured to the first half-cylinder side portion, the first header assembly having cylindrical wall portions defining a first annular header chamber for receiving cryogenic cooling fluid, a first inlet port connected in fluid communication with the first header chamber for admitting cryogenic cooling fluid into said header chamber, and multiple fluid discharge openings formed in a wall portion of the first header assembly for discharging cryogenic cooling fluid from the first annular header chamber into the cooling chamber and onto an enclosed surface portion of the pipeline section; and,
- a second header assembly concentrically disposed within the detachable housing and secured to the second half-cylinder side portion, the second header assembly having cylindrical wall portions defining a second annular header chamber for receiving cryogenic cooling fluid, a second inlet port connected in fluid communication with the second header chamber for admitting cryogenic cooling fluid into the second header chamber, and multiple fluid discharge openings formed in a wall portion of the second header assembly for discharging cryogenic cooling fluid from the second annular header chamber into the cooling chamber and onto an enclosed surface portion of the pipeline section.

* * * * *